United States Patent
Uy et al.

(10) Patent No.: US 11,445,374 B2
(45) Date of Patent: Sep. 13, 2022

(54) SYSTEMS AND METHODS FOR AUTHENTICATING A SUBSCRIBER IDENTITY MODULE SWAP

(71) Applicant: Verizon Patent and Licensing Inc., Basking Ridge, NJ (US)

(72) Inventors: Warren Hojilla Uy, Randolph, NJ (US); Mun Wei Low, Irving, TX (US); Young Rak Choi, Belle Mead, NJ (US); Manuel Enrique Caceres, Basking Ridge, NJ (US); Taussif Khan, Martinsville, NJ (US)

(73) Assignee: Verizon Patent and Licensing Inc., Basking Rldge, NJ (US)

( * ) Notice: Subject to any disclaimer, the term of this patent is extended or adjusted under 35 U.S.C. 154(b) by 0 days.

(21) Appl. No.: 16/949,956

(22) Filed: Nov. 20, 2020

(65) Prior Publication Data

US 2022/0167152 A1 May 26, 2022

(51) Int. Cl.
*H04W 12/30* (2021.01)
*H04L 9/40* (2022.01)
*H04W 8/18* (2009.01)
*H04W 8/20* (2009.01)

(52) U.S. Cl.
CPC ......... *H04W 12/35* (2021.01); *H04L 63/0853* (2013.01); *H04W 8/183* (2013.01); *H04W 8/205* (2013.01)

(58) Field of Classification Search
CPC ...... H04W 12/35; H04W 8/183; H04W 8/205
See application file for complete search history.

(56) References Cited

U.S. PATENT DOCUMENTS

| | | | | |
|---|---|---|---|---|
| 2003/0008637 | A1* | 1/2003 | Vatanen | G06Q 20/326 455/410 |
| 2004/0233930 | A1* | 11/2004 | Colby, Jr. | H04W 12/069 370/464 |
| 2006/0121882 | A1* | 6/2006 | Zhao | H04W 12/033 455/411 |
| 2007/0011466 | A1* | 1/2007 | Imura | G07C 9/33 713/186 |
| 2008/0040285 | A1* | 2/2008 | Wankmueller | G06Q 20/40 705/67 |
| 2008/0123831 | A1* | 5/2008 | Flensted-Jensen | H04M 3/42314 379/212.01 |
| 2014/0156545 | A1* | 6/2014 | Clapham | G06Q 50/18 705/311 |

(Continued)

*Primary Examiner* — Barry W Taylor

(57) ABSTRACT

A first user device may provide, to a provisioning device, a request for a subscriber identity module (SIM) swap that causes provisioning data to be provided to a first SIM card of the first user device and from a second SIM card of a second user device. The first user device may generate a first encrypted token based on a first identifier associated with the first SIM card. The first user device may provide, to the provisioning device, the first encrypted token and a user identifier. The first user device may selectively receive the provisioning data when the first encrypted token matches a second encrypted token generated by the second user device based on a second identifier associated with the second SIM card, or receive a message indicating that the first user device cannot be provisioned, when the first encrypted token fails to match the second encrypted token.

20 Claims, 7 Drawing Sheets

(56) References Cited

U.S. PATENT DOCUMENTS

| | | | | |
|---|---|---|---|---|
| 2014/0172712 A1* | 6/2014 | Petersen | ............... | G06Q 10/00 |
| | | | | 705/44 |
| 2015/0071442 A1* | 3/2015 | Wang | .................. | H04L 9/3226 |
| | | | | 380/270 |
| 2015/0341779 A1* | 11/2015 | Dawson-Haney | ... | H04B 1/3816 |
| | | | | 455/418 |
| 2017/0353939 A1* | 12/2017 | Behera | .................... | H04W 8/18 |
| 2020/0137566 A1* | 4/2020 | Jin | ........................ | H04W 76/14 |
| 2020/0296581 A1* | 9/2020 | Loreskar | ............. | H04L 63/0853 |
| 2020/0320538 A1* | 10/2020 | Smith | ................. | G06Q 20/4016 |
| 2021/0195411 A1* | 6/2021 | Ratnakaram | ........ | H04L 63/0853 |

\* cited by examiner

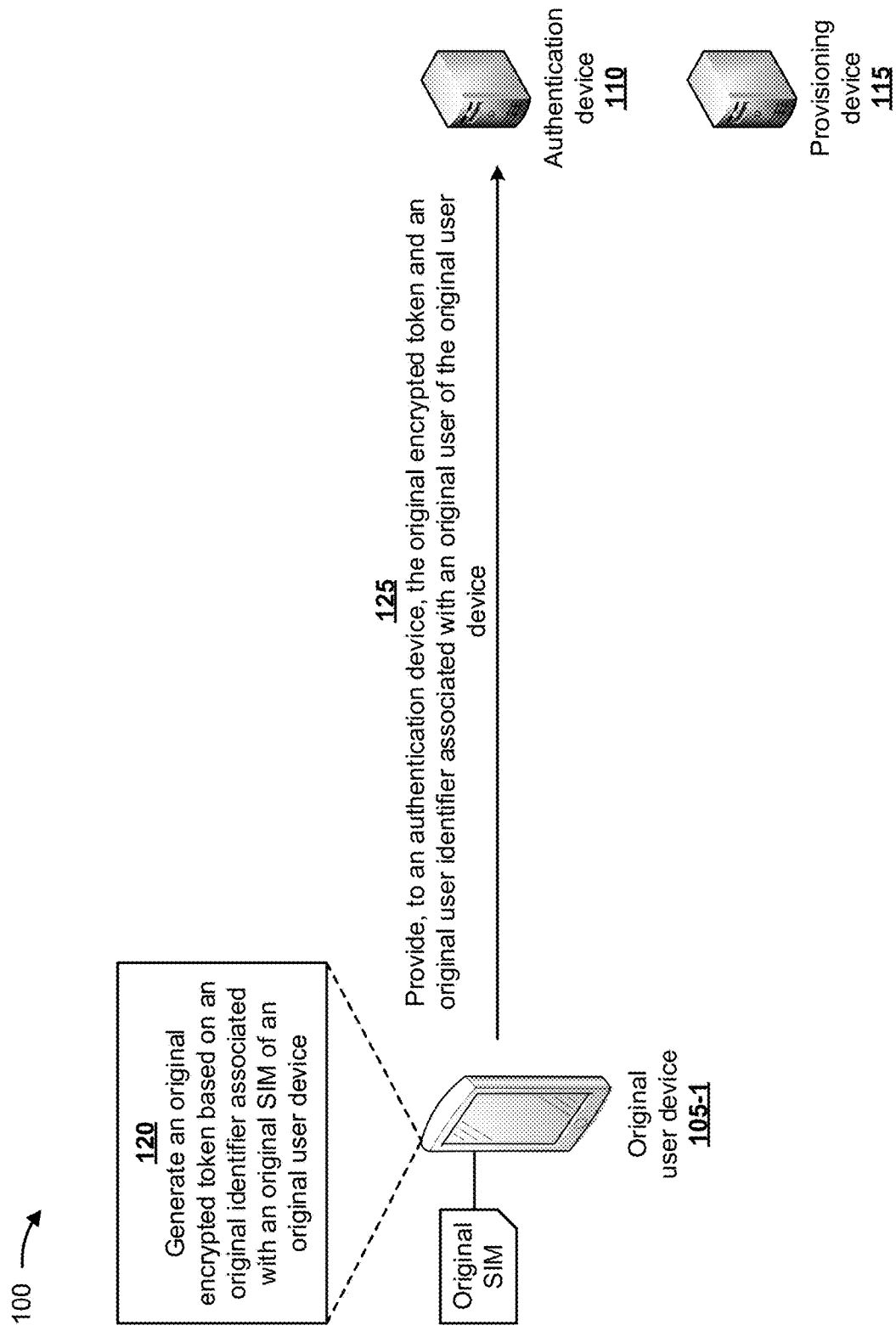

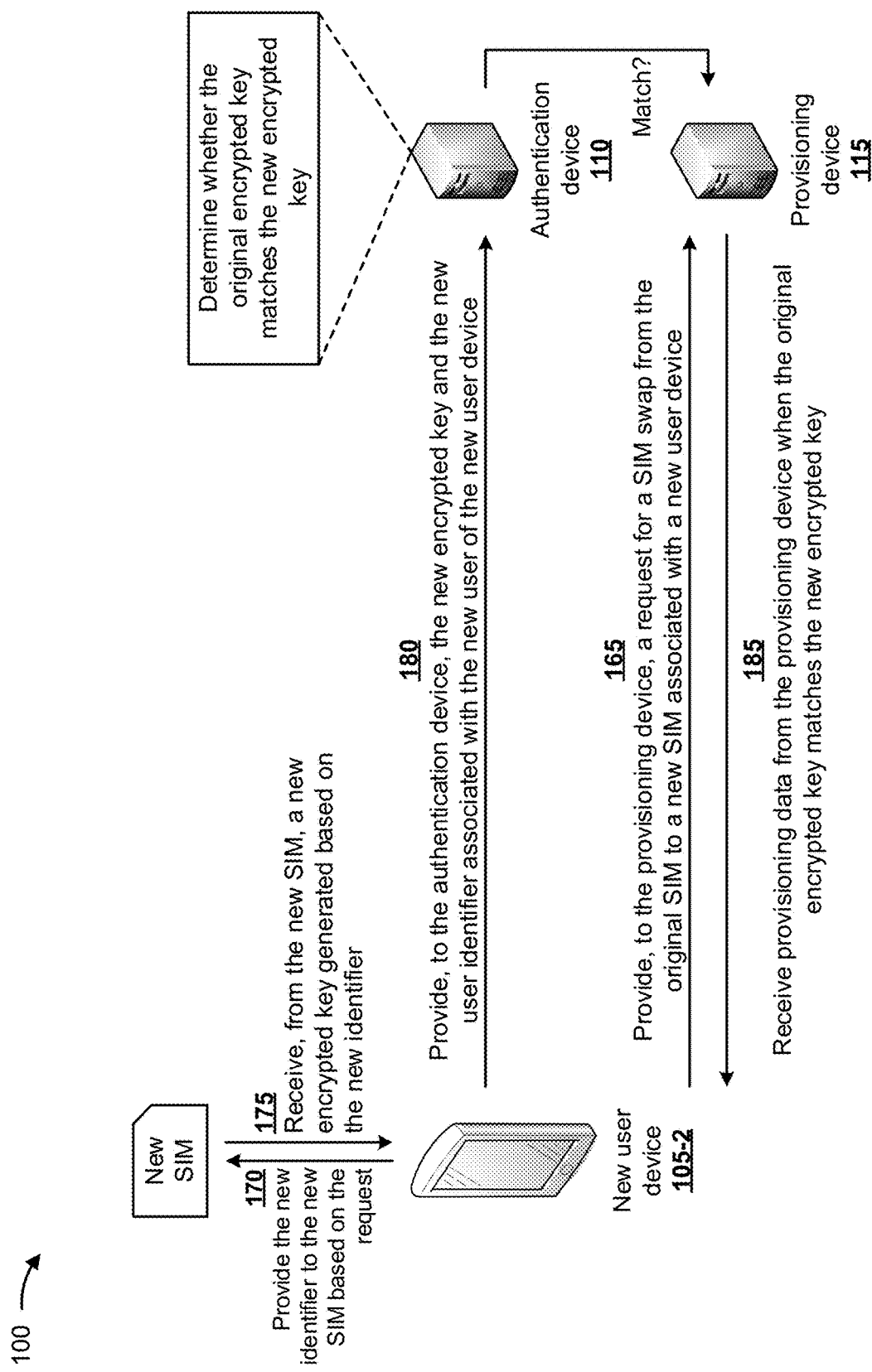

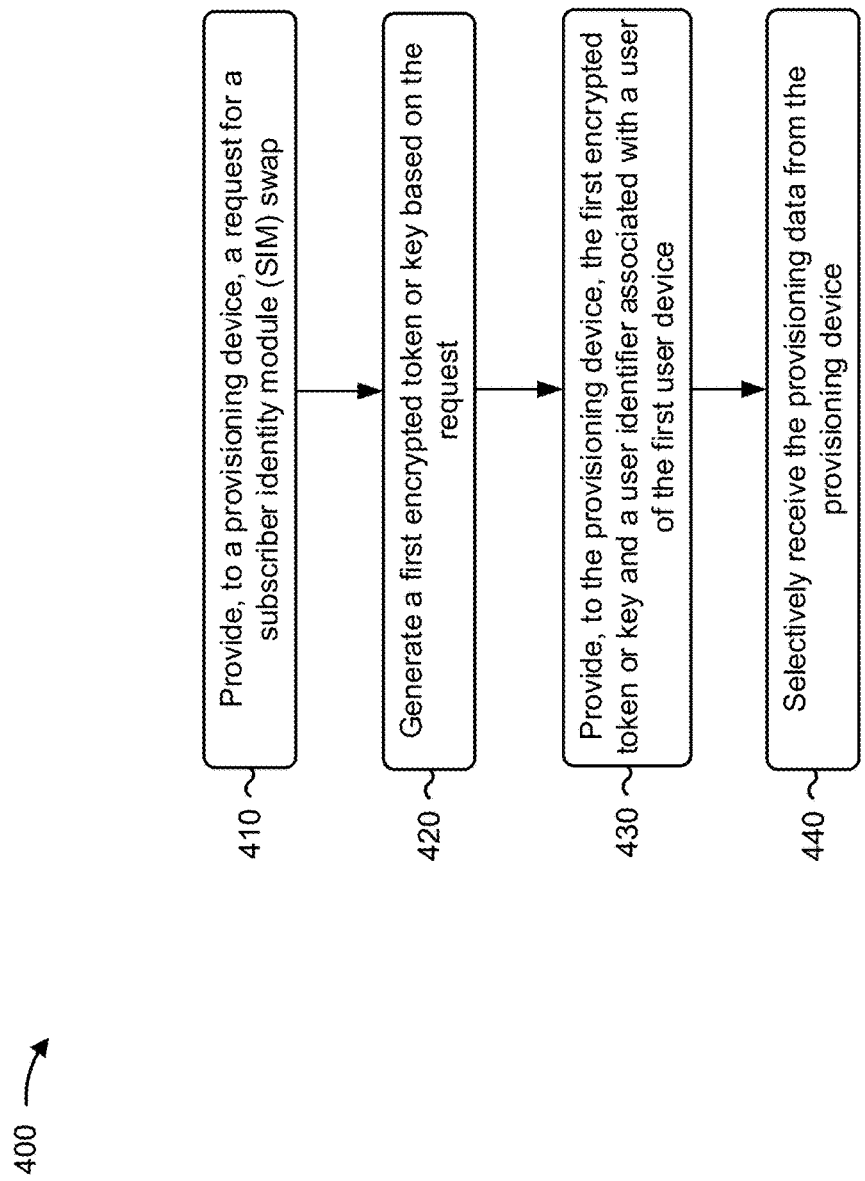

SYSTEMS AND METHODS FOR AUTHENTICATING A SUBSCRIBER IDENTITY MODULE SWAP

BACKGROUND

A user device may include a subscriber identity module (SIM) card. The SIM card is an integrated circuit that is capable of securely storing data such as an international mobile subscriber identity (IMSI) and a related key. A user device and/or a SIM card may be activated to enable the user device to access a network.

BRIEF DESCRIPTION OF THE DRAWINGS

FIGS. 1A-1D are diagrams of one or more example implementations described herein.

FIG. 4 is a flow chart of an example process for authenticating a SIM swap.

DETAILED DESCRIPTION OF PREFERRED EMBODIMENTS

Figure 1B:
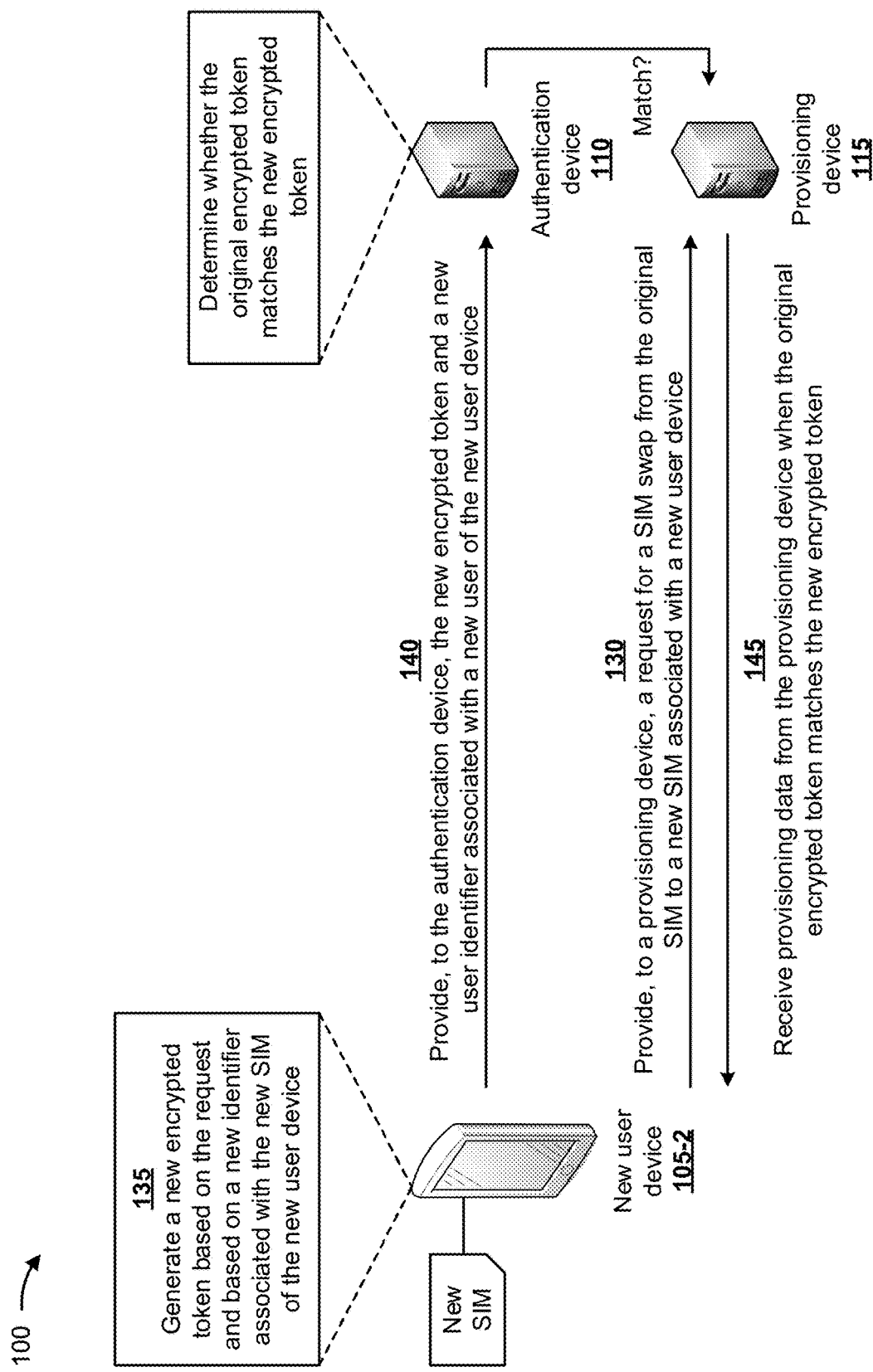

The following detailed description of example implementations refers to the accompanying drawings. The same reference numbers in different drawings may identify the same or similar elements.

A SIM swap attack is an attack where telecommunications network personnel are tricked into porting a victim's telephone number to a SIM card possessed by a malicious actor (e.g., an attacker). For example, an attacker may call telecommunications network personnel to report a "lost" user device of a victim, and to request porting the victim's telephone number to the SIM card possessed by the attacker. Typical victims of SIM swap attacks include high-profile individuals, such as famous actors, leaders of large corporations, professional athletes, and/or the like. The SIM swap attack may be used to target a weakness in two-factor authentication and to steal large quantities of money via cryptocurrency or other financial accounts. This, in turn, wastes computing resources (e.g., processing resources, memory resources, communication resources, and/or the like), networking resources, and/or the like associated with identifying SIM swap attacks, recovering quantities of money stolen via the SIM swap attacks, identifying and prosecuting individuals responsible for the SIM swap attacks, and/or the like.

Some implementations described herein provide systems and/or methods for authenticating a SIM swap. For example, a first user device may provide, to a provisioning device, a request for a SIM swap that causes provisioning data to be provided to a first SIM card associated with the first user device and from a second SIM card associated with a second user device. The first user device may generate a first encrypted token or key based on the request and based on a first identifier associated with the first SIM card, and may provide, to the provisioning device, the first encrypted token or key and a user identifier associated with a user of the first user device. The first user device may selectively receive the provisioning data from the provisioning device when the first encrypted token or key matches a second encrypted token or key generated by the second user device based on a second identifier associated with the second SIM card of the second user device, or receive, from the provisioning device, a message indicating that the first user device cannot be provisioned, when the first encrypted token or key fails to match the second encrypted token or key.

In this way, the systems and/or methods described herein may authenticate a SIM swap between two different user devices. This is accomplished by having an original user device generate a token or a key for an original SIM card based on a personal identification number (PIN), a password, a biometric, and/or the like associated with the original SIM card. A new user device may generate a token or a key for a new SIM card based on a PIN, a password, a biometric, and/or the like associated with the new SIM card. If the old token or key matches the new token or key, then the SIM swap may occur and the new SIM card may be provisioned for network usage. Thus, SIM swap fraud is minimized by introducing the SIM swap authentication and, for legitimate user scenarios, reduces customer care calls by automating the SIM swap in conjunction with an online portal. The "lost" user device attack is also minimized since the original token or key cannot be generated by a malicious actor. This, in turn, conserves computing resources, networking resources, and/or the like that would otherwise have been wasted in identifying SIM swap attacks.

FIGS. 1A-1D are diagrams of one or more example implementations 100 associated with authenticating a SIM swap. As shown in FIGS. 1A-1D, example implementations 100 include user devices 105, an authentication device 110, and a provisioning device 115. User device 105 may include a mobile phone, a laptop computer, a tablet computer, a drone, an autonomous vehicle, and/or the like. Authentication device 110 may include a device that authenticates a SIM swap between two different user devices 105. Provisioning device 115 may include a device that provisions a new SIM card for network usage when a SIM swap between two different user devices 105 is authenticated by authentication device 110. Although authentication device 110 and provisioning device 115 are shown separately in FIGS. 1A-1D, in some implementations, functions of authentication device 110 and provisioning device 115 may be combined into a single device.

As shown in FIG. 1A, an original user device 105-1 may include an original SIM card. The original SIM card may include an integrated circuit that securely stores an IMSI number and a related key, which are used to identify and authenticate a user of the original user device 105-1.

As further shown in FIG. 1A, and by reference number 120, the original user device 105-1 may generate an original encrypted token based on an original identifier associated with the original SIM card. The original identifier associated with the original SIM card may include a personal identification number (PIN), a password, a biometric input (e.g., a fingerprint), and/or the like associated with an original user of the original SIM card and/or the original user device 105-1. The original user device 105-1 may utilize the original identifier to generate the original token and to encrypt the original token (e.g., to provide the original encrypted token). In some implementations, the original user device 105-1 may receive a public key generated by authentication device 110 and may encrypt the original token with the public key to generate the original encrypted token.

As further shown in FIG. 1A, and by reference number 125, the original user device 105-1 may provide, to authentication device 110, the original encrypted token and an original user identifier associated with the original user of the original user device 105-1. The original user identifier may include a telephone number associated with the original user device 105-1, a username associated with the original user, an account number associated with the original user, and/or the like. In some implementations, the original user device 105-1 may include an application that provides the public key to the original user device 105-1, causes the original user device 105-1 to generate the original encrypted token based on the original identifier associated with the original SIM card, causes the original user device 105-1 to provide, to authentication device 110, the original encrypted token and the original user identifier, and/or the like.

Authentication device 110 may receive the original encrypted token and the original user identifier, and may store the original encrypted token and the original user identifier in a data structure (e.g., a database, a table, a list, and/or the like) associated with authentication device 110. In some implementations, authentication device 110 may associate, in the data structure, the original encrypted token and the original user identifier with information identifying the original SIM card and/or the original user device 105-1.

As shown in FIG. 1B, a new user device 105-2 may include a new SIM card. The new SIM card may include an integrated circuit that securely stores an IMSI number and a related key, which are used to identify and authenticate a user of the new user device 105-2.

As further shown in FIG. 1B, and by reference number 130, the new user device 105-2 may provide, to provisioning device 115, a request for a SIM swap from the original SIM card to the new SIM card associated with the new user device 105-2. In some implementations, the new user device 105-2 may initiate a call with provisioning device 115, and may provide the request for the SIM swap to provisioning device 115 via the call. In some implementations, the SIM swap may be associated with replacing the original SIM card with the new SIM card in the original user device 105-1, swapping from the original SIM card to the new SIM card provided in the new user device 105-2, and/or the like.

As further shown in FIG. 1B, and by reference number 135, the new user device 105-2 may generate a new encrypted token based on the request for the SIM swap and based on a new identifier associated with the new SIM card of the new user device 105-2. The new identifier associated with the new SIM card may include a PIN, a password, a biometric input, and/or the like associated with a user of the new SIM card and/or the new user device 105-2. The new user device 105-2 may utilize the new identifier to generate the new token and to encrypt the new token (e.g., to provide the new encrypted token). In some implementations, the new user device 105-2 may receive a public key generated by authentication device 110 and may encrypt the new token with the public key to generate the new encrypted token.

As further shown in FIG. 1B, and by reference number 140, the new user device 105-2 may provide, to authentication device 110, the new encrypted token and a new user identifier associated with the new user of the new user device 105-2. The new user identifier may include a telephone number associated with the new user device 105-2, a username associated with the new user, an account number associated with the new user, and/or the like. In some implementations, the new user device 105-2 may include an application that provides the public key to the new user device 105-2, causes the new user device 105-2 to generate the new encrypted token based on the new identifier associated with the new SIM card, causes the new user device 105-2 to provide, to authentication device 110, the new encrypted token and the new user identifier, and/or the like.

As further shown in FIG. 1B, authentication device 110 may receive the new encrypted token and the new user identifier, and may determine whether the original encrypted token matches the new encrypted token. In some implementations, authentication device 110 may decrypt the original encrypted token and the new encrypted token (e.g., with a private key associated with the public key) and may determine whether the original token (e.g., the decrypted original encrypted token) matches the new token (e.g., the decrypted new encrypted token). Authentication device 110 may retrieve the original encrypted token from the data structure when determining whether the original encrypted token matches the new encrypted token. In some implementations, authentication device 110 may determine whether the new user identifier is valid before determining whether the original encrypted token matches the new encrypted token. As further shown, authentication device 110 may provide, to provisioning device 115, an indication of whether the original encrypted token matches the new encrypted token.

If authentication device 110 provides, to provisioning device 115, an indication that the original encrypted token matches the new encrypted token, provisioning device 115 may determine that the new encrypted token is authentic. When the new encrypted token is authentic (e.g., when the original encrypted token matches the new encrypted token), and as shown by reference number 145 in FIG. 1B, the new user device 105-2 may receive provisioning data from provisioning device 115. The provisioning data may include data that enables the new SIM card to be activated to enable the new user device 105-2 to access a network. In some implementations, the new user device 105-2 may receive, from provisioning device 115, an instruction to restart the new user device 105-2, when the original encrypted token matches the new encrypted token and after receiving the provisioning data.

If authentication device 110 provides, to provisioning device 115, an indication that the original encrypted token fails to match the new encrypted token, provisioning device 115 may determine that the new encrypted token is not authentic. When the new encrypted token is not authentic, the new user device 105-2 may receive, from provisioning device 115, a message indicating that the new SIM card and/or the new user device 105-2 cannot be provisioned since the original encrypted token fails to match the new encrypted token. In some implementations, the new user device 105-2 may receive, from provisioning device 115, a request to provide the new encrypted token and the new user identifier to authentication device 110 and/or provisioning device 115 again, when the original encrypted token fails to match the new encrypted token. In some implementations, provisioning device 115 may provide data identifying the new user and the new user device 105-2 to a government agency when the original encrypted token fails to match the new encrypted token. In some implementations, provisioning device 115 may provide data identifying the new user and the new user device 105-2 to the original user device 105-1 associated with the original SIM card when the original encrypted token fails to match the new encrypted token.

Figure 1C:
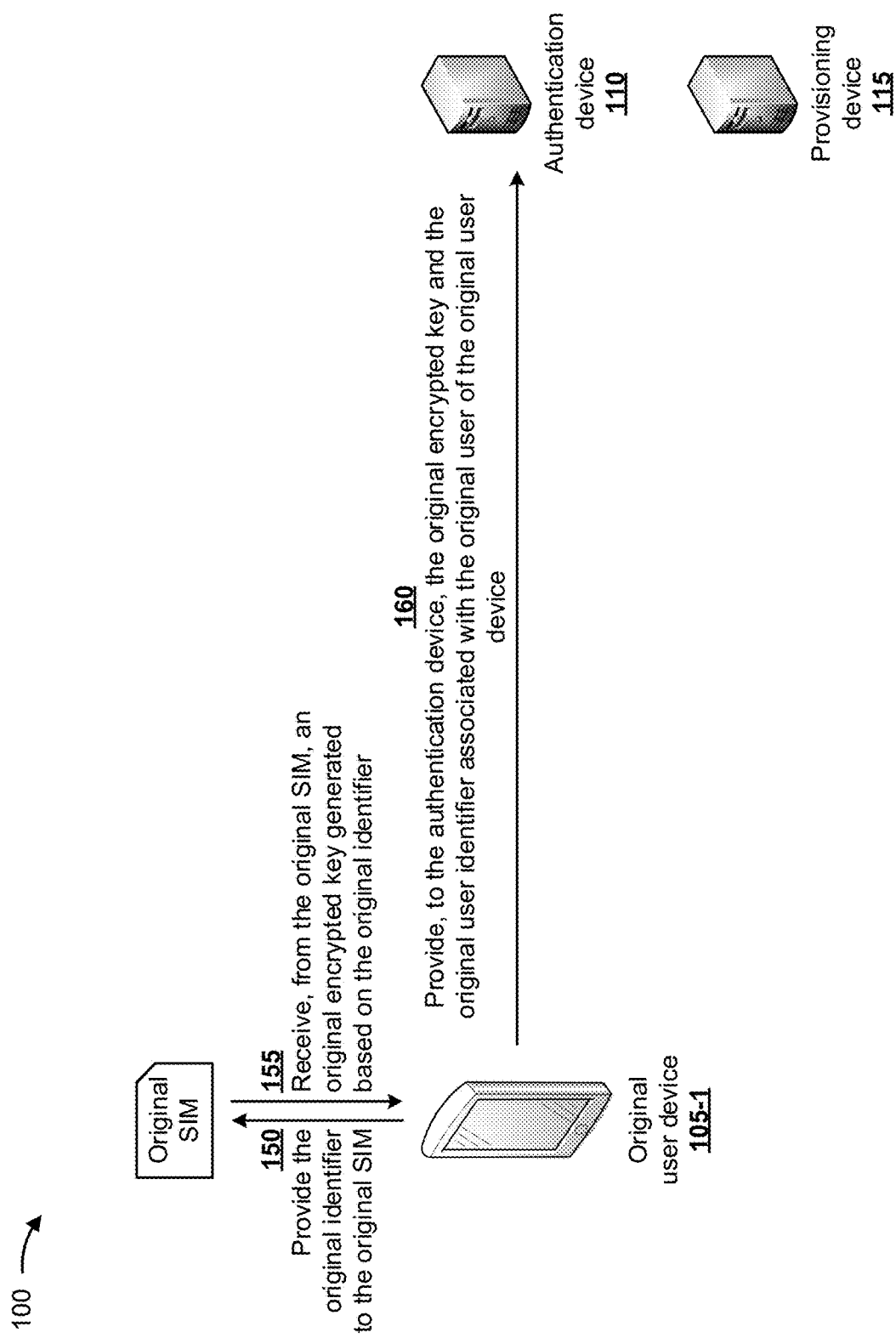

As shown in FIG. 1C, and by reference number 150, the original user device 105-1 may provide the original identifier (e.g., the PIN, the password, the biometric input, and/or the like associated with the original user of the original SIM card and/or the original user device 105-1) to the original SIM card. The original SIM card may generate an original encrypted key based on the original identifier. The original SIM card may utilize the original identifier to generate the original key and to encrypt the original key (e.g., to provide the original encrypted key). In some implementations, the original SIM card may receive a public key generated by authentication device 110 and may encrypt the original key with the public key to generate the original encrypted key.

As further shown in FIG. 1C, and by reference number 155, the original user device 105-1 may receive, from the original SIM card, the original encrypted key generated based on the original identifier. As further shown in FIG. 1C, and by reference number 160, the original user device 105-1 may provide, to authentication device 110, the original encrypted key and the original user identifier (e.g., a telephone number, a username, an account, and/or the like) associated with the original user of the original user device 105-1. In some implementations, the original user device 105-1 includes an application that provides the public key to the original user device 105-1, causes the original user device 105-1 to provide the original identifier to the original SIM card, and causes the original user device 105-1 to provide the original encrypted key and the original user identifier to authentication device 110. Alternatively, or additionally, the original user device 105-1 may include a setup wizard that causes the original user device 105-1 to provide the original identifier to the original SIM card, and causes the original user device 105-1 to provide the original encrypted key and the original user identifier to authentication device 110.

In some implementations, the original SIM card includes an application (e.g., an applet) that causes the original SIM card to generate the original encrypted key based on the original identifier and to provide the original encrypted key to the original user device 105-1. In some implementations, the application (e.g., the applet) may reside in a secure element or a trusted environment of the original user device 105-1 (e.g., outside of the original SIM card), may reside in a cloud computing environment that is accessible by a SIM swap application executing on the original user device 105-1, and/or the like.

Authentication device 110 may receive the original encrypted key and the original user identifier, and may store the original encrypted key and the original user identifier in the data structure associated with authentication device 110. In some implementations, authentication device 110 may associate, in the data structure, the original encrypted key and the original user identifier with information identifying the original SIM card and/or the original user device 105-1.

As shown in FIG. 1D, and by reference number 165, the new user device 105-2 may provide, to provisioning device 115, a request for a SIM swap from the original SIM card to the new SIM card associated with the new user device 105-2. In some implementations, the new user device 105-2 may initiate a call with provisioning device 115, and may provide the request for the SIM swap to provisioning device 115 via the call. In some implementations, the SIM swap may be associated with replacing the original SIM card with the new SIM card in the original user device 105-1, swapping from the original SIM card to the new SIM card provided in the new user device 105-2, and/or the like.

As further shown in FIG. 1D, and by reference number 170, the new user device 105-2 may provide the new identifier (e.g., the PIN, the password, the biometric input, and/or the like associated with the new user of the new SIM card and/or the new user device 105-2) to the new SIM card. The new SIM card may generate a new encrypted key based on the new identifier. The new SIM card may utilize the new identifier to generate the new key and to encrypt the new key (e.g., to provide the new encrypted key). In some implementations, the new SIM card may receive a public key generated by authentication device 110 and may encrypt the new key with the public key to generate the new encrypted key.

As further shown in FIG. 1D, and by reference number 175, the new user device 105-2 may receive, from the new SIM card, the new encrypted key generated based on the new identifier. As further shown in FIG. 1D, and by reference number 180, the new user device 105-2 may provide, to authentication device 110, the new encrypted key and the new user identifier (e.g., a telephone number, a username, an account, and/or the like) associated with the new user of the new user device 105-2. In some implementations, the new user device 105-2 includes an application that provides the public key to the new user device 105-2, causes the new user device 105-2 to provide the new identifier to the new SIM card, and causes the new user device 105-2 to provide the new encrypted key and the new user identifier to authentication device 110. Alternatively, or additionally, the new user device 105-2 may include a setup wizard that causes the new user device 105-2 to provide the new identifier to the new SIM card, and causes the new user device 105-2 to provide the new encrypted key and the new user identifier to authentication device 110.

In some implementations, the new SIM card includes an application (e.g., an applet) that causes the new SIM card to generate the new encrypted key based on the new identifier and to provide the new encrypted key to the new user device 105-2.

As further shown in FIG. 1D, authentication device 110 may receive the new encrypted key and the new user identifier, and may determine whether the original encrypted key matches the new encrypted key. In some implementations, authentication device 110 may decrypt the original encrypted key and the new encrypted key (e.g., with a private key associated with the public key) and may determine whether the original key (e.g., the decrypted original encrypted key) matches the new key (e.g., the decrypted new encrypted key). Authentication device 110 may retrieve the original encrypted key from the data structure when determining whether the original encrypted key matches the new encrypted key. In some implementations, authentication device 110 may determine whether the new user identifier is valid before determining whether the original encrypted key matches the new encrypted key. As further shown, authentication device 110 may provide, to provisioning device 115, an indication of whether the original encrypted key matches the new encrypted key.

If authentication device 110 provides, to provisioning device 115, an indication that the original encrypted key matches the new encrypted key, provisioning device 115 may determine that the new encrypted key is authentic. When the new encrypted key is authentic (e.g., when the original encrypted key matches the new encrypted key), and as shown by reference number 185 in FIG. 1D, the new user device 105-2 may receive, from provisioning device 115, provisioning data that enables the new SIM card to be activated to enable the new user device 105-2 to access a network. In some implementations, the new user device 105-2 may receive, from provisioning device 115, an instruction to restart the new user device 105-2, when the original encrypted key matches the new encrypted key and after receiving the provisioning data.

If authentication device 110 provides, to provisioning device 115, an indication that the original encrypted key fails to match the new encrypted key, provisioning device 115 may determine that the new encrypted key is not authentic.

When the new encrypted key is not authentic, the new user device 105-1 may receive, from provisioning device 115, a message indicating that the new SIM card and/or the new user device 105-2 cannot be provisioned since the original encrypted key fails to match the new encrypted key. In some implementations, the new user device 105-2 may receive, from provisioning device 115, a request to provide the new encrypted key and the new user identifier to authentication device 110 and/or provisioning device 115 again, when the original encrypted key fails to match the new encrypted key. In some implementations, provisioning device 115 may provide data identifying the new user and the new user device 105-2 to a law enforcement agency when the original encrypted key fails to match the new encrypted key. In some implementations, provisioning device 115 may provide data identifying the new user and the new user device 105-2 to the original user device 105-1 associated with the original SIM card when the original encrypted key fails to match the new encrypted key.

In some implementations, the asymmetric keys (e.g., the private key and the public key pair), described above, may be replaced with a symmetric key by sharing an identical private key with the original user device 105-1, authentication device 110, and provisioning device 115. The symmetric key may be pre-shared (e.g., via a key ceremony to exchange symmetric key and preload the symmetric key on devices during device manufacturing and/or development) and not shared in real time due to high risk. Although implementations are described herein in connection with the original user device 105-1 and the new user device 105-2, the implementations may also be utilized with a single user device 105 of a subscriber that wishes to transfer a telephone number and credentials from an original SIM card of the single user device 105 to a new SIM card of the single user device 105.

In this way, the systems and/or methods described herein may authenticate a SIM swap between two different user devices 105. This is accomplished by having an original user device 105 generate a token or a key for an original SIM card based on a PIN, a password, a biometric, and/or the like associated with the original SIM card. A new user device 105 may generate a token or a key for a new SIM card based on a PIN, a password, a biometric, and/or the like associated with the new SIM card. If the old token or key matches the new token or key, then the SIM swap may occur and the new SIM card may be provisioned for network usage. This, in turn, conserves computing resources, networking resources, and/or the like that would otherwise have been wasted in identifying SIM swap attacks, recovering quantities of money stolen via the SIM swap attacks, identifying and prosecuting individuals responsible for the SIM swap attacks, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
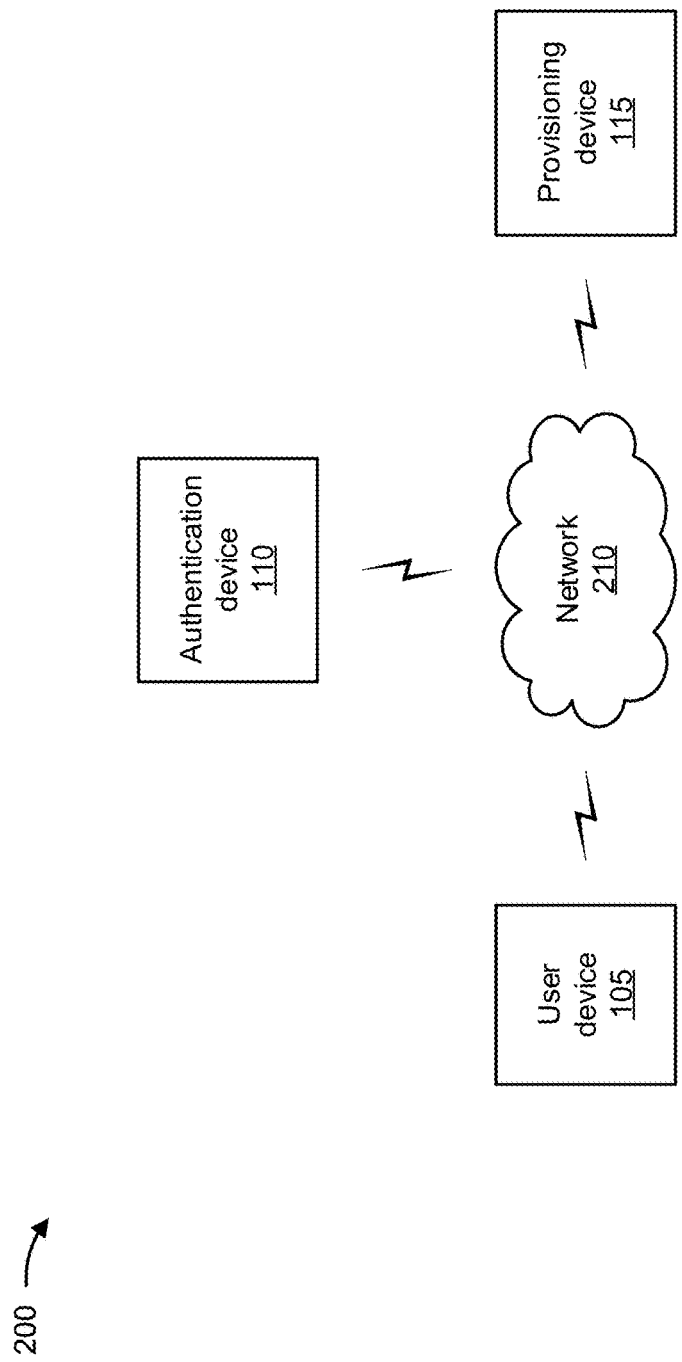
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user device 105, authentication device 110, provisioning device 115, and/or a network 210. Devices and/or elements of environment 200 may interconnect via wired connections and/or wireless connections.

User device 105 includes one or more devices capable of receiving, generating, storing, processing, and/or providing information associated with authenticating a SIM swap with another user device 105, as described elsewhere herein. User device 105 may include a communication device and/or a computing device. For example, user device 105 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 105 may communicate with one or more other devices of environment 200, as described elsewhere herein.

Authentication device 110 includes one or more devices capable of receiving, generating, storing, processing, providing, and/or routing information associated with authenticating a SIM swap between two different user devices 105, as described elsewhere herein. Authentication device 110 may include a communication device and/or a computing device. For example, authentication device 110 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Authentication device 110 may communicate with one or more other devices of environment 200, as described elsewhere herein.

Provisioning device 115 includes one or more devices capable of receiving, generating, storing, processing, providing, and/or routing information associated with provisioning a new SIM card for network usage when a SIM swap between two different user devices 105 is authenticated by authentication device 110. Provisioning device 115 may include a communication device and/or a computing device. For example, provisioning device 115 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Provisioning device 115 may communicate with one or more other devices of environment 200, as described elsewhere herein.

Network 210 includes one or more wired and/or wireless networks. For example, network 210 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. Network 210 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
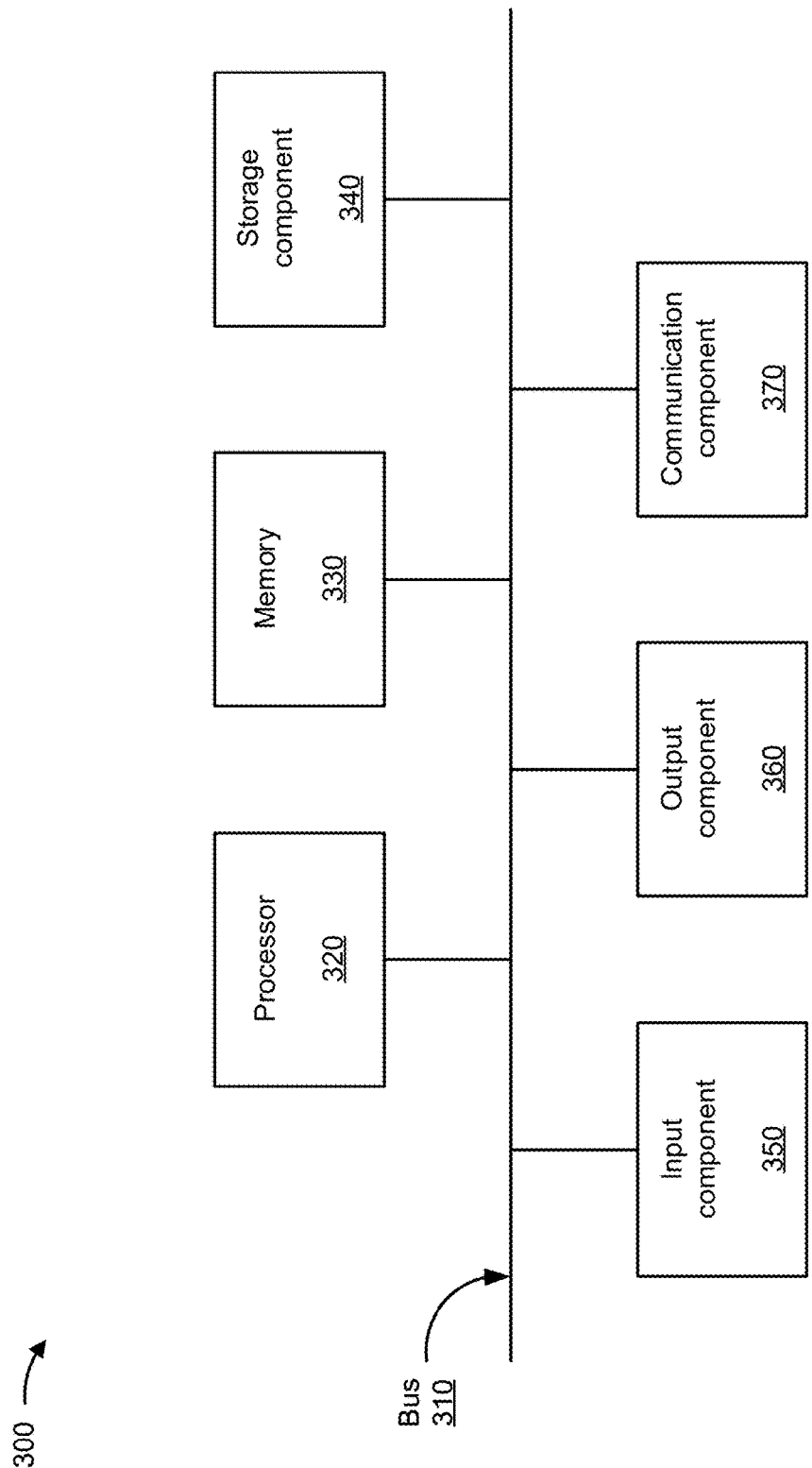
FIG. 3 is a diagram of example components of one or more devices of FIG. 2.

FIG. 3 is a diagram of example components of a device 300, which may correspond to user device 105, authentication device 110, and/or provisioning device 115. In some implementations, user device 105, authentication device 110, and/or provisioning device 115 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with authenticating a subscriber identity module swap. In some implementations, one or more process blocks of FIG. 4 may be performed by a device (e.g., the new user device 105-2). In some implementations, one or more process blocks of FIG. 4 may be performed by another device or a group of devices separate from or including the device, such as authentication device 110 and/or provisioning device 115. Additionally, or alternatively, one or more process blocks of FIG. 4 may be performed by one or more components of device 300, such as processor 320, memory 330, storage component 340, input component 350, output component 360, communication component 370, and/or the like.

As shown in FIG. 4, process 400 may include providing, to a provisioning device, a request for a subscriber identity module (SIM) swap that causes provisioning data to be provided to a first SIM card associated with the first user device and from a second SIM card associated with a second user device (block 410). For example, the first user device (e.g., the new user device 105-2) may provide, to a provisioning device, a request for a SIM swap that causes provisioning data to be provided to a first SIM card associated with the first user device and from a second SIM card associated with a second user device, as described above.

As further shown in FIG. 4, process 400 may include generating a first encrypted token or key based on the request and based on a first identifier associated with the first SIM card (block 420). For example, the first user device (e.g., the new user device 105-2) may generate a first encrypted token or key based on the request and based on a first identifier associated with the first SIM card, as described above.

As further shown in FIG. 4, process 400 may include providing, to the provisioning device, the first encrypted token or key and a user identifier associated with a user of the first user device (block 430). For example, the first user device (e.g., the new user device 105-2) may provide, to the provisioning device, the first encrypted token or key and a user identifier associated with a user of the first user device, as described above.

As further shown in FIG. 4, process 400 may include selectively receiving the provisioning data from the provisioning device when the first encrypted token or key matches a second encrypted token or key generated by the second user device based on a second identifier associated with the second SIM card of the second user device, or receiving, from the provisioning device, a message indicating that the first user device cannot be provisioned, when the first encrypted token or key fails to match the second encrypted token or key (block 440). For example, the first user device (e.g., the new user device 105-2) may selectively receive the provisioning data from the provisioning device when the first encrypted token or key matches a second encrypted token or key generated by the second user device based on a second identifier associated with the second SIM card of the second user device, or receive, from the provisioning device, a message indicating that the first user device cannot be provisioned, when the first encrypted token or key fails to match the second encrypted token or key, as described above.

Process 400 may include additional implementations, such as any single implementation or any combination of implementations described below and/or in connection with one or more other processes described elsewhere herein.

In a first implementation, the first identifier includes one or more of a personal identification number (PIN), a password, or a biometric input.

In a second implementation, alone or in combination with the first implementation, the user identifier includes one or more of a telephone number associated with the first user device, a username associated with the user of the first user device, or an account number associated with the user of the first user device.

In a third implementation, alone or in combination with one or more of the first and second implementations, generating the first encrypted token or key based on the request and based on the first identifier associated with the first SIM card includes providing the first identifier to the first SIM card, wherein the first SIM card generates the first encrypted token or key based on the first identifier, and receiving the first encrypted token or key from the first SIM card.

In a fourth implementation, alone or in combination with one or more of the first through third implementations, the first user device includes an application that causes the first user device to generate the first encrypted token or key and to provide the first encrypted token or key and the user identifier to the provisioning device.

In a fifth implementation, alone or in combination with one or more of the first through fourth implementations, the first user device includes an application that causes the first user device to provide the first identifier to the first SIM card and to provide the first encrypted token or key and the user identifier to the provisioning device, and the first SIM card includes an applet that causes the first SIM card to generate the first encrypted token or key based on the first identifier and to provide the first encrypted token or key to the first user device.

In a sixth implementation, alone or in combination with one or more of the first through fifth implementations, the first user device includes a setup wizard that causes the first user device to provide the first identifier to the first SIM card, to receive the first encrypted token or key from the first SIM card, and to provide the first encrypted token or key and the user identifier to the provisioning device.

In a seventh implementation, alone or in combination with one or more of the first through sixth implementations, process 400 includes receiving, from the provisioning device, an instruction to restart the user device, when the first encrypted token or key matches the second encrypted token or key and after receiving the provisioning data.

In an eighth implementation, alone or in combination with one or more of the first through seventh implementations, process 400 includes receiving a request to provide the first encrypted token or key and the user identifier to the provisioning device again, when the first encrypted token or key fails to match the second encrypted token or key.

In a ninth implementation, alone or in combination with one or more of the first through seventh implementations, data identifying the user and the user device is utilized to report to a law enforcement agency when the first encrypted token or key fails to match the second encrypted token or key.

In a tenth implementation, alone or in combination with one or more of the first through ninth implementations, data identifying the user and the user device is utilized to report to the second user device associated with the second SIM card when the first encrypted token or key fails to match the second encrypted token or key.

In an eleventh implementation, alone or in combination with one or more of the first through tenth implementations, providing, to the provisioning device, the request for the SIM swap includes initiating a call with the provisioning device, and providing the request for the SIM swap to the provisioning device via the call.

In a twelfth implementation, alone or in combination with one or more of the first through eleventh implementations, process 400 includes receiving an application, and installing the application, wherein the application causes the user device to generate the first encrypted token or key and to provide the first encrypted token or key and the user identifier to the provisioning device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   providing, by a first user device and to a provisioning device, a request for a subscriber identity module (SIM) swap that causes provisioning data to be provided to a first SIM card associated with the first user device and from a second SIM card associated with a second user device;
   generating, by an application of the first user device, a first token or key based on the request and based on one or more first user-provided SIM identifiers associated with the first SIM card,
      wherein the one or more first user-provided SIM identifiers include one or more of:
         a personal identification number (PIN),
         a password, or
         a biometric input;
   encrypting, by the application of the first user device and using a public key provided by the application of the first user device, the first token or key to generate a first encrypted token or key;
   providing, by the first user device and to the provisioning device, the first encrypted token or key and one or more user identifiers associated with a user of the first user device,
      wherein the one or more user identifiers include one or more of:
         a telephone number associated with the first user device,
         a username associated with the user, or
         an account number associated with the user; and
   selectively:
      receiving, by the first user device, the provisioning data from the provisioning device when the first encrypted token or key matches a second encrypted token or key generated by the second user device based on one or more second user-provided SIM identifiers associated with the second SIM card of the second user device, or
      receiving, by the first user device and from the provisioning device, a message indicating that the first user device cannot be provisioned, when the first encrypted token or key fails to match the second encrypted token or key.

2. The method of claim 1, wherein the one or more first user-provided SIM identifiers include two or more of:
   the PIN,
   the password, or
   the biometric input.

3. The method of claim 1, wherein the one or more user identifiers include two or more of:
   the telephone number,
   the username, or
   the account number.

4. The method of claim 1, wherein the application of the first user device causes the first user device to provide the first encrypted token or key and the one or more user identifiers to the provisioning device.

5. The method of claim 1, wherein, when the first encrypted token or key fails to match the second encrypted token or key, data identifying the user and the first user device is utilized to one or more of:
   report to a law enforcement agency, or
   report to another user device associated with the second SIM card.

6. The method of claim 1, further comprising:
   receiving a request to provide the first encrypted token or key and the one or more user identifiers to the provisioning device again, when the first encrypted token or key fails to match the second encrypted token or key.

7. The method of claim 1, wherein the first encrypted token or key is a first encrypted token; and
   wherein the second encrypted token or key is a second encrypted token.

8. A user device, comprising:
   one or more processors configured to:
      provide, to a provisioning device, a request for a subscriber identity module (SIM) swap that causes provisioning data to be provided to a first SIM card associated with the user device and from a second SIM card;
      generate a first token or key based on the request and based on one or more first user-provided SIM identifiers associated with the first SIM card,
         wherein the one or more first user-provided SIM identifiers include one or more of:
            a personal identification number (PIN),
            a password, or
            a biometric input;
      encrypt, using a public key provided by an application of the user device, the first token or key to generate a first encrypted token or key;
      provide, to the provisioning device, the first encrypted token or key and one or more user identifiers associated with a user of the user device,
         wherein the one or more user identifiers include one or more of:
            a telephone number associated with the user device,
            a username associated with the user, or
            an account number associated with the user; and
         selectively:
            receive the provisioning data from the provisioning device when the first encrypted token or key matches a second encrypted token or key generated based on one or more second user-provided SIM identifiers associated with a second SIM card, or receive, from the provisioning device, a message indicating that the user device cannot be provisioned, when the first encrypted token or key fails to match the second encrypted token or key.

9. The user device of claim 8, wherein the one or more processors are further configured to:
receive, from the provisioning device, an instruction to restart the user device, when the first encrypted token or key matches the second encrypted token or key and after receiving the provisioning data.

10. The user device of claim 8, wherein the one or more processors are further configured to:
receive a request to provide the first encrypted token or key and the one or more user identifiers to the provisioning device again, when the first encrypted token or key fails to match the second encrypted token or key.

11. The user device of claim 8, wherein data identifying the user and the user device is utilized to report to a law enforcement agency when the first encrypted token or key fails to match the second encrypted token or key.

12. The user device of claim 8, wherein data identifying the user and the user device is utilized to report to another user device associated with the second SIM card when the first encrypted token or key fails to match the second encrypted token or key.

13. The user device of claim 8, wherein the one or more processors, when providing, to the provisioning device, the request for the SIM swap, are configured to:
initiate a call with the provisioning device; and
provide the request for the SIM swap to the provisioning device via the call.

14. The user device of claim 8, wherein the one or more processors are further configured to:
receive the application; and
install the application,
wherein the application causes the user device to generate the first encrypted token or key and to provide the first encrypted token or key and the user identifier to the provisioning device.

15. A non-transitory computer-readable medium storing a set of instructions, the set of instructions comprising:
one or more instructions that, when executed by one or more processors of a first user device, cause the first user device to:
provide, to a provisioning device, a request for a subscriber identity module (SIM) swap that causes provisioning data to be provided to a first SIM card associated with the first user device and from a second SIM card associated with a second user device;
generate a first key based on the request and based on one or more first user-provided SIM identifiers associated with the first SIM card,
wherein the one or more first user-provided SIM identifiers include one or more of:
a personal identification number (PIN),
a password, or
a biometric input;
encrypt, using a public key provided by an application of the first user device, the first key to generate a first encrypted key;
provide, to the provisioning device, the first encrypted key and one or more user identifiers associated with a user of the first user device;
wherein the one or more user identifiers include one or more of:
a telephone number associated with the first user device,
a username associated with the user, or
an account number associated with the user; and
selectively:
receive the provisioning data from the provisioning device when the first encrypted key matches a second encrypted key generated by the second user device based on one or more second user-provided SIM identifiers associated with a second SIM card of the second user device, or
receive, from the provisioning device, a message indicating that the first user device cannot be provisioned, when the first encrypted key fails to match the second encrypted key.

16. The non-transitory computer-readable medium of claim 15, wherein the one or more instructions further cause the first user device to:
receive, from the provisioning device, an instruction to restart the first user device, when the first encrypted key matches the second encrypted key and after receiving the provisioning data.

17. The non-transitory computer-readable medium of claim 15, wherein the one or more instructions further cause the first user device to:
receive a request to provide the first encrypted key and the one or more user identifiers to the provisioning device again, when the first encrypted key fails to match the second encrypted key.

18. The non-transitory computer-readable medium of claim 15, wherein the one or more first user-provided SIM identifiers include two or more of:
the PIN,
the password, or
the biometric input.

19. The non-transitory computer-readable medium of claim 15, wherein the one or more user identifiers include two or more of:
the telephone number,
the username, or
the account number.

20. The non-transitory computer-readable medium of claim 15, wherein, when the first encrypted key fails to match the second encrypted key, data identifying the user and the first user device is utilized to one or more of:
report to a law enforcement agency, or
report to another user device associated with the second SIM card.

* * * * *